United States Patent [19]

Nelson

[11] Patent Number: 4,557,694
[45] Date of Patent: Dec. 10, 1985

[54] TEACHING DEVICE AND METHOD OF USING SAME

[76] Inventor: Roy A. Nelson, 25 Oakwood Rd., Acton, Mass. 01720

[21] Appl. No.: 528,731

[22] Filed: Sep. 1, 1983

Related U.S. Application Data

[63] Continuation of Ser. No. 319,748, Nov. 9, 1981, abandoned.

[51] Int. Cl.$^4$ .............................................. G09B 7/06
[52] U.S. Cl. .................................... 434/339; 434/341; 273/1 E
[58] Field of Search ................................ 434/227–232, 434/322, 327, 335, 339, 341, 346; 340/365 VL; 273/1 E

[56] References Cited

U.S. PATENT DOCUMENTS

| | | | |
|---|---|---|---|
| 3,158,317 | 11/1964 | Alexander | 364/900 |
| 3,187,321 | 6/1975 | Kameny | 364/200 |
| 3,600,592 | 8/1971 | Mahan et al. | 340/365 VL |
| 3,757,322 | 9/1973 | Barkan et al. | 273/237 |
| 3,771,240 | 11/1973 | Matui | 434/339 |
| 4,026,555 | 5/1977 | Kirschner et al. | 273/85 G |
| 4,059,272 | 11/1977 | Pullman | 273/237 |
| 4,156,928 | 5/1979 | Inose et al. | 273/237 |

*Primary Examiner*—Richard C. Pinkham
*Assistant Examiner*—Leo P. Picard

*Attorney, Agent, or Firm*—Wolf, Greenfield & Sacks

[57] ABSTRACT

A small console containing a keypad such as an elastomeric array keypad and a microprocessor which is preprogrammed with a number of simple algorithms. The individual keys (switches) are preferably, although not necessarily, hidden to the user and are arranged in sets providing, for example, 8 data lines each having a plurality of keys associated therewith some lines of which, for a particular algorithm, are redundant, and other dedicated keys. The user directly programs the device at the keypad by inputting the solution to the particular question. The data inputting is provided secretively by using an overlay placed over the keypad on the console. The overlay provides some pictorial and text description of the game. The overlay is basically demarcated into a programming region which provides a visual instruction to the user for the temporary programming of the device by pressing an indicated sequence of keys in an indicated order, and a play region which visually indicates the selection of possible notations, each associated with a key, including correct and incorrect notations. The correct keys in the play region simply correspond to those previously inputted during the program step. Because the overlay hides the keypad and because of the preferred random spacial distribution of keys of each set, the user is unaware of which keys input the same code as the ones previously used to program the device.

25 Claims, 14 Drawing Figures

TEACHING DEVICE AND METHOD OF USING SAME

This application is a continuation of application Ser. No. 319,748, filed on Nov. 9, 1981, now abandoned.

BACKGROUND OF THE INVENTION

The present invention relates in general to a man-machine interfacing system sometimes referred to as an interactive device, and pertains more particularly to a teaching device that may be embodied either as a learning aid basically for educational purposes or for entertainment purposes as a game.

In the development of interactive devices, particularly those employing data processing including a microprocessor, a program is written into the system and this program contains facts or other information against which the player is to be measured. There is an interface through which the player inputs the decisions or answers. The player entries are compared with the initial program data and there is usually some type of visual or audible conclusion to the player.

For example, one known interactive device is Spellbinder. This game employs a notched mastercard which in effect "programs" a console, allowing a player to respond to the visual stimuli presented on the card, by inserting individual different response cards. The correct response card with its notched array is in accordance with the notched coding found on the mastercard.

There are also a series of computer games wherein the computer is internally preprogrammed or externally programmed through a medium such as with the use of disks, tapes, cartridges, cards, and the like. The player responds to the video, or possibly audio stimulus by inputting his decision through a keyboard. In addition, there are other electronic games presently on the market which require a player to respond with inputs which are compared with internal standards either built-in or permanently preprogrammed or loaded through some data transfer technique. Such prepogammed devices have serious limitations. For example, if a device is used to teach spelling, then there would be required a substantial repetoire to say spell one thousand different words. The inputting of programs externally from data banks, cards, or cartridges is expensive. Therefore, this requires that the machine be preprogrammed for all possible selections.

Accordingly, it is an object of the present invention to provide an interactive device which requires only minimal memory capacity and minimal preprogramming.

Another object of the present invention is to provide a teaching device that lends itself readily to a wide variety of individual games, questions, and concepts.

Still another object of the present invention is to provide a teaching device in which the user directly programs the device secretively. This programming occurs preferably just prior to the commencement of play by the user.

A further object of the present invention is to provide a teaching device having a small console containing a keypad such as an elastomeric array keypad and a microprocessor which is preprogrammed for basically only introducing a number of simple algorithms with the remainder of the programming inserted by the player in accordance with an instructional overlay.

In addition to the aforementioned known games, a search of the Patent Office Records also discloses the following U.S. patents: U.S. Pat. Nos. 3,371,321; 3,584,398; 3,729,836; 3,787,988; 3,999,307; 4,051,605; 4,107,784; 4,118,876; 4,156,928; 4,164,078.

U.S. Pat. No. 4,156,928, Inose et al., discloses a programmable television game and training system that utilizes a keyboard in combination with various ROM cartridges to provide different games or training sequences. An optional RAM cartridge provide user programmability if desired.

U.S. Pat. No. 4,107,784, Van Bemmeien, discloses a management control terminal that utilizes a visual display to provide prompting messages of an instructional nature.

U.S. Pat. No. 4,051,605, Toal et al., discloses an educational calculator that displays problems and indicates correct or erroneous user responses.

All of the above patents are characterized by a complete preprogramming either internally or externally with the use of cartridges or the like. Again, none of the art shows the concepts of the present invention of providing at least limited preprogramming directly by the user on a secretive basis with the use of instructional overlays.

SUMMARY OF THE INVENTION

In accordance with the present invention there is provided a teaching device which may be adapted for use either as a learning aid or game. This device is preferably of simple and inexpensive construction requiring minimal memory capacity and minimal preprogramming. It is adapted to lending itself readily to a wide variety of individual games and teaching activities. The device comprises a console including a keypad such as an elastomeric array keypad and a microprocessor which is preprogrammed with a number of simple algorithms. The keypad may be provided in an array of, for example, $8 \times 9$ keys or any other similar managable size array. The individual keys or switches are preferably, although not necessarily, hidden to the user and are arranged in sets providing, for example, eight data lines each having a plurality of data keys associated therewith, some lines of which, for a particular algorithm, are redundant. The keypad also includes other dedicated functional keys. The data keys of each set are preferably randomly disposed about the keypad array. Thus, any one of a number of different data keys provide the same input signal to the microprocessor. As indicated, the data keys within each set are randomly distributed over the keypad and the connections among the keys of a set are not apparent to the user. As previously mentioned, some of the keys are functional and dedicated. Of the dedicated functional keys, the microprocessor interprets the input of a first dedicated key as selecting the "program" mode. Then a second functional key "finish" or "execute" key concludes the initial programming mode. The remaining keys making up the array are disposed in the aforementioned sets and are of variable inputs the particular meaning of which is defined for each individual game or teaching activity by the use of an overlay. The simplicity of the device is provided by having-the user directly program the device at the keypad by inputting the solution to the particular question, or the winning move of the particular game, before commencing play. The data inputting is provided secretively by the use of the aforementioned overlay placed over the keypad console. The overlay provides some pictorial and text description of the game or teaching activity represented by the overlay. The rest of the overlay is demarcated into two regions. A first region is referred to as a programming region which provides a visual instruction to the user for the temporary but specific programming of the device by pressing an indicated sequence of keys in an indicated order. This sequence includes the "program" mode select functional key, followed by two algorithm select data keys, followed by a plurality of data keys such as five or six which input the solution, followed by a verify code concluding with the "execute" functional key. The microprocessor responds to the "program" mode key by storing the information which follows it. The algorithm select data keys are decoded and the appropriate algorithm is retreived from program memory repetoire. The codes representing the solution are stored. The selected algorithm defines the nature of the game or questions (simple spelling, arithmetic, board game, selection of prime numbers from a set of numbers, and the like). The verify code is used to check that the other keyed information has been correctly entered. The other region of the overlay is a play region wherein there is visually indicated the selection of possible notations, each associated with a key, including correct and incorrect notations. The correct keys in the play region simply correspond to those previously inputted during the program step. Because the overlay hides the keypad and because of the preferred random spatial distribution of keys of each set, the user is unaware of which keys input the same code as the ones previously used to program the device. Also, endless numbers of overlays can be devised, each having its own set of visual program entry instructions and selection solutions. The device of the present invention does not operate on the basis of committed keys as in a keyboard, but instead is more interested in the sequence struck by the player during the "play" mode and matching this sequence with the information previously programmed during the "program" mode.

In accordance with another embodiment of the present invention, rather than providing a single overlay with both programming and play regions, there can be provided two separate overlays, one a program overlay and the other a play overlay. Furthermore, there is described in accordance with the present invention a method for playing a game or performing a teaching activity with the use of a keypad console and associated overlays that permit secretive preprogramming of the microprocessor and thereafter, direct play.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

The device of this invention may be used either as a teaching apparatus or it may be used as a game. One advantage of the device is that it requires little memory and only minimal preprogramming while at the same time providing a wide variety of individual games or teaching activities. The simplicity of the device is accomplished at least in part by having the user of the device program the device by inputting, in addition to certain programming instructions, the solution to the particular question, or the winning move of a particular game, prior to commencement of play. However, although the user programs the solution this is done without his knowledge, simply following predetermined visual instructions associated with an overlay with each instructional notation corresponding with a predetermined key of the keypad of the console of the device.

Once the solution has been programmed, then operation reverts to the play mode in which a sequence of correct keys are to be selected from an offered set including both correct and incorrect choices. The correct keys are to be pushed, in a predetermined sequence. For example, a picture of an object may be displayed to the user together with a set of some fifteen possible letter choices. Among the letter choices are those making up the correct spelling of the name of the object, together with other letters which are incorrect. Each letter choice is associated with a key. The user must push, for example, five or six keys associated with the correct spelling of the name of the object. When this is done correctly the device provides an indication to the user of success and also indicates failure of the correct key selections.

Although in the preferred embodiment of the present invention, the programming and play overlays are embodied in a single overlay sheet, in one of the simplified versions of the present invention there may be provided separate programming and play overlays. There may be, for example, ten switches in the keypad all connected to separate lines coupling to the microprocessor. There may also be other keys for controlling the input of data to the microprocessor such as switches for mode control and algorithm control. The membrane switches are preferably hidden from view and particularly are hidden by the overlay. The first sheet used is a programming sheet with instructions thereon to push particular dots or other notations in sequence together with any necessary accompanying operational keys. Upon reading these instructions the player pushes in sequence, for example, key #1, then key #2, then key #3. The instructional notations or dots are located over these corresponding hidden keys. The programming sheet is then replaced with a play sheet which is also preprinted and which may have a heading such as "spell CAT" and which has letters scattered throughout the overlay including but not limited to the letters C, A and T. The letter C is directly above key #1, the letter A above key #2, and the letter T above key #3. The device is not interested in committed keys dedicated to the letters C A T, as in a typewriter keyboard. The device instead is only interested in the sequence struck by the player of key #1, key #2 and key #3 during the "play" mode, this having been identically programmed during the "program" mode. Upon entry of the correct selections during the "play" mode, there is some type of a visual or audible indication of correct selections, or there is an indication of an incorrect selection if one is made.

With this simplified version there may also be provided a new playing sheet. There is actually no need for new programming as long as the new sheet is for spelling a similar three letter word. This new sheet could have on it the request "spell DOG". The microprocessor simply watches for the sequence of keys, namely key #1, key #2 and key #3. The fact that these keys correspond to the letters D O G is immaterial to the microprocessor. Letter D, now instead of the letter C as in the previous example, is located over key #1, the letter O is over key #2, and the letter G is over key #3. There are also provided distractor notations. For example, on this sheet there could be the letter K, but if this is selected there would be a switch key #4 associated therewith which would be in the incorrect sequence and this would be detected by the microprocessor indicating an incorrect solution.

The next generation of the device is one in which both the programming sheet and play sheet are incorporated in one overlay with, for example, the programming instructions being on the right hand side and the playing area being on the left hand side. These two areas could also be arranged in many different positional relationships. This makes it more difficult for the player to cheat in that now there is no immediate visual correlation between programming and response keys. Furthermore, it is desired to provide several keys on each line, both in the program area and in the response or playing area. By providing a number of different lines, more than those in the word to be spelled, there is accommodation for incorrect notations.

In the preferred system, as mentioned previously, there is both programming and responding or playing on one sheet. There is thus no visual cohesion between programming and playing. The system of the present invention also adapts itself to the programming of a word which contains repeat letters. With the system of this invention it does not require the use of the same program key again. For example, the teaching activity may be to teach the spelling of the word SEED. This may correspond to a sequence of key #1, key #2, key #2, and key #3. This is possible because of the availabiltiy of more than one key for line #2 in the program area. However, the player is not aware that he is repeating a key and correspondingly a letter. Furthermore, only one letter "E" is required in the playing area. It is not desired to have two separate letter "E's" each with its own line as this would require a complication of the activity. Thus, if on the program side the word SEED were allocated key #1, key #2, key #3, key #4, on the playing side two "E's" would have to be available, "E" for line #2 and another "E" for line #3. This introduces excess complicity unnecessarily into the activity.

In accordance with the present invention as indicated previously unused lines contain distractors or incorrect notations. In the previously referred to example where only lines #1-#3 are used, and in an eight line system, this means that lines #4-#8 or five lines each with possible multiple keys, can contain many distractors. If it is assumed that each line in the playing area has six key paths this results in thirty distractors. This is more than necessary particularly in the entire alphabet after having assigned S for key #1, E for key #2, and D for key #3.

It is also noted that the same identical programming sequence is available for spelling other words such as the word WOOD. The player still responds by key stroking in the programming phase key #1, key #2, key #2, and key #3. With regard to the word WOOD, the "W" is placed anywhere on line #1, the "O" anywhere on line #2 and the "D" anywhere on line #3. Thus there is a new problem with the same solution but in no way are the two visually correlated. The same type of flexability also applies to the programming section. Thus, the programming for the spelling of CAT does not have to be limited to lines #1, #2 and #3. The sequence could be lines #8, #5 and #2. This provides great flexibility.

In still another alternative version of the invention the overlay may have the visual instructions on one or both sides and may have on one side the programming sequence. The paper may then be turned over and the entire reverse side may be used thus enabling use of all of the hidden keys for the player response mode.

In accordance with the present invention the programming keys can be used to call up any of many different interplay concepts. Keys can be used for a table look-up thus eliminating the need for the player to strike in sequence a one-to-one correspondence with program or playing keys.

With regard to the improper programming, this has been solved efficiently by employing the key matrix with overlays. Furthermore, parity or the like checking is preferably employed.

As indicated previously, flexability also extends to the programming mode. In this mode there are preferably multiple positions (key entries to the same index line) available for the same significant key text. Thus, for example, when programming the word TREE, line #1 is assigned to the letter T, line #2 to the letter R and line #3 to the letter E. The player enters the program by selecting, under direction of the overlay, entries on lines #1, #2, and #3 with there being a double entry on line #3 but not necessarily by the same key on that line. If the design were limited to only one available programming position for the line #3 entry, then it would be necessary for the player to enter the line #3 button twice, giving the player the information that there are two repetitive concurrent letters. This is not desired. Thus, the design preferably allows for four entries, but spatially distributed at four different locations, thereby not allowing the player or programmer any a priori conclusion regarding the structure of the answer.

Hence, in accordance with the present invention there is provided visible uncorrelatable multiplicity of entry points to the same line numbers, allowing programming of repetitive elements, without providing any clue to the structure of the answer. This also requires only the use of one symbol during the response mode such as one letter E in the spelling of the word TREE which can be repetitively accessed whenever necessary.

Figure 1:
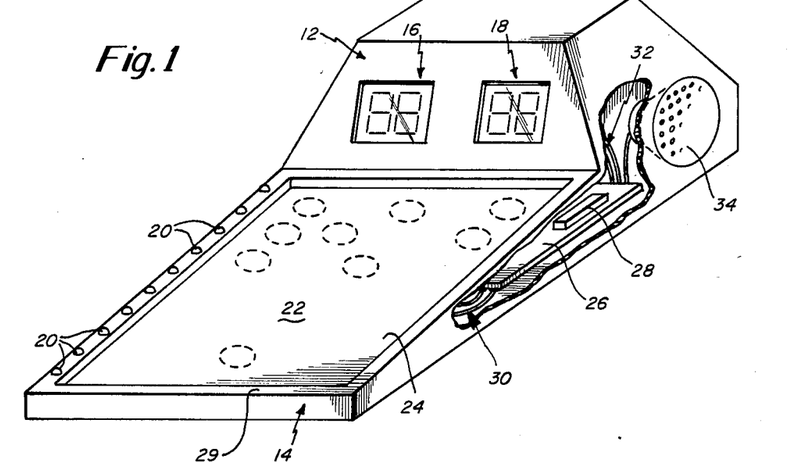
FIG. 1 is a perspective view of the keypad console partially broken away to show internal circuitry mounted on the printed circuit board disposed generally under the keypad.
Figure 2:
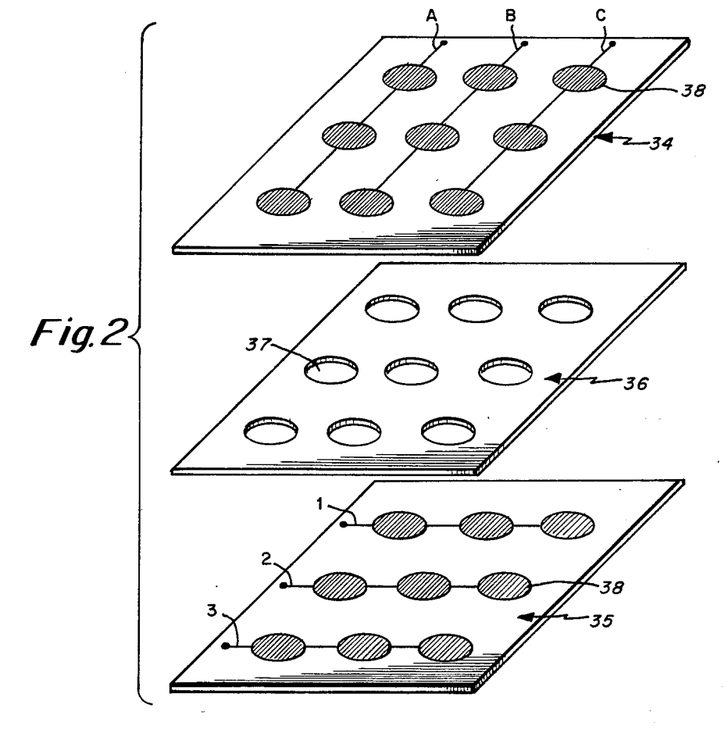
FIG. 2 shows the components of the keypad for a simple 3×3 matrix employing nine keypads.

FIG. 1 is a perspective view showing the keypad console of the present invention. This console comprises a rear section 12 and a front section 14. The rear section 12 supports two digit seven segment indicators 16 and 18. The indicator 16 may display the number of the tries and the indicator 18 may display the number correct in that given number of tries. Along one side of the front section 14 there are disposed a series of indicator lights 20 each associated with an X coordinate of the keypad 22. The lights 20 may also be used to flag questions which may be itemized down the left hand side of the overlay during the question/response mode. A simplified keypad construction is shown in FIG. 2. These keypads may be hidden by an opague layer 24 upon which the overlays rest.

Within the console housing there is a printed circuit board 26 upon which is mounted the electronics of the present system including a microcomputer or microprocessor chip 28. Other electronic components are also mounted on the printed circuit board to be discussed hereinafter with regard to the schematic diagram of FIG. 7. For example, there could be drivers associated with the indicators shown in FIG. 1. FIG. 1 also shows a cable 30 which couples from the printed circuit board to the keypad or keyboard. Also shown is a second cable 32 which couples between the printed circuit board and the indicators. A speaker 34 is preferably also provided for giving an audible signal for correct and/or incorrect answers.

Figure 6:
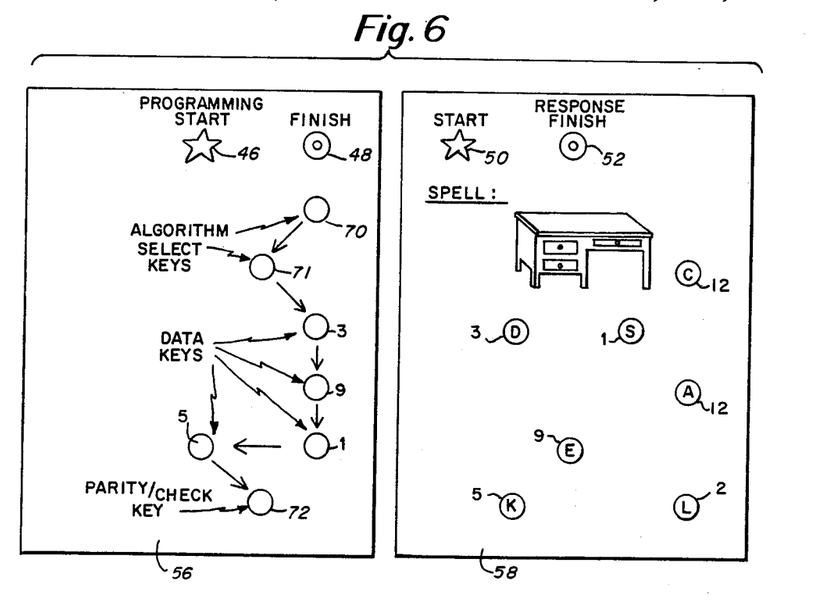
FIG. 6 shows a programming overlay and a response overlay which are used in sequence with the console of FIG. 1.

The front section 22 of the console is constructed with a peripheral ridge 29 that defines a recessed trough having its bottom defined by the layer 24. It is within the trough that the programming overlay and the response overlay is positioned. Typical overlays are shown in FIG. 6.

FIG. 2 shows in an exploded view a typical keypad design including contact members 34 and 35 separated by spacer 36. The spacer 36 is a flat, thin sheet having a plurality of apertures 37. The switch structure shown in FIG. 2 is a 3×3 array for providing nine separate lines coupled to the computer. These nine different switch activations are signaled on lines A, B and C and on lines #1, #2, and #3, thus being disposed in two sets of three signal lines each. These lines may be identified as lines A1, A2, A3, B1, B2, B3, C1, C2, C3. The contact members 34 and 35 each carry a conductive contact 38 with nine such contacts per member and with the contacts arranged in the same pattern as the apertures 37 in the spacer 36. The lines leading from each of the contact members are lines coupling in the cable 30 represented in FIG. 1. Although a 3×3 matrix is shown in FIG. 2, it is understood that the data lines can be of any number.

Figure 3:
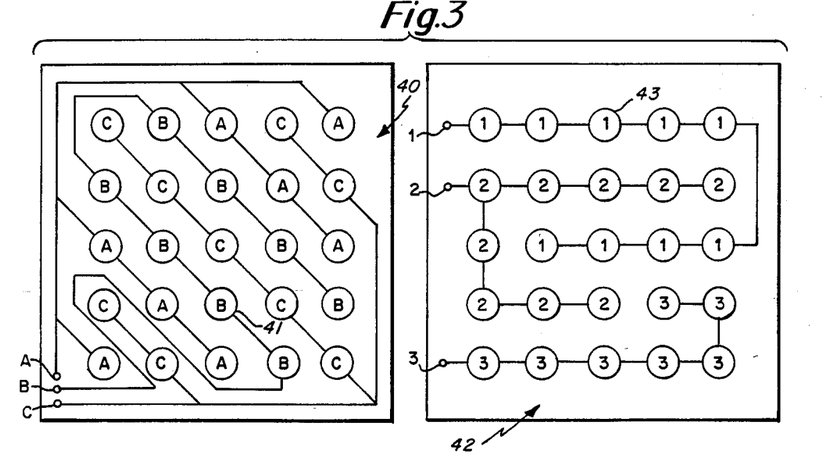
FIG. 3 also shows a 3-line by 3-line keypad arrangement but one employing multiple key switches associated with each line.

FIG. 3 shows an extended design permitting multiple entries at the keypad but still in the basic 3×3 array providing multiple keypads associated with each line. Thus, in FIG. 3 there is provided a contact member 40 and a second contact member 42. A spacer would be used between these but is not shown in FIG. 3. It would be of the type shown in FIG. 2. In FIG. 3 the individual contacts 41 appear on the underside of the member. Similarly, on the other contact plate 42 the contacts 43 appear on the top side of this member. The spacer separates these except when an actuation occurs to the selected key or switch.

It is noted in FIG. 3 that with regard to the member 40, there are eight such keys A. The contact of any one of which will complete an electrical path to terminal A. There are also a similar plurality of contact switches B and contact switches C. A similar arrangement appears with regard to the member 42 and its contacts #1, #2 and #3. Each has a plurality of switches associated therewith in the particular pattern selected in FIG. 3.

Figure 4:
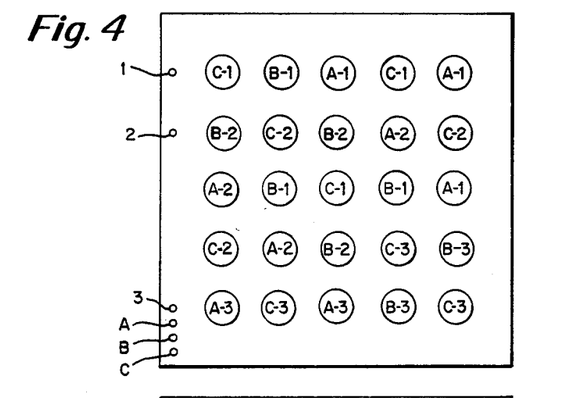
FIG. 4 schematically represents the nine different line designations with multiple entries associated with each line.

FIG. 4 schematically represents the resultant signals. There are still a total of nine separate signals or lines that are generated from the 3×3 matrix. These are identified as lines A1, A2, A3; B1, B2, B3; and C1, C2 and C3. However, each of these has multiple entries. Thus, in the top X axis row of FIG. 4 it is noted that there are two different keys that can give the C1 signal and also two different keys that can give the A1 signal. For most of the entries there are three identical entries at three different positions with the exception of lines A3 and B3 which have only two entries. This provides a total of 25 keypads in this particular array but arranged from a signal standpoint in a 3×3 array as indicated.

Figure 5:
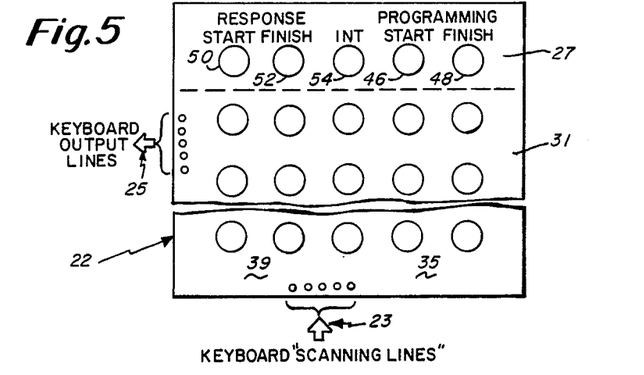
FIG. 5 schematically depicts the keypad and its associated function and data areas and representative connections to the microprocessor.

FIG. 5 shows the keypad 22 having multiple keyboard input scanning lines 23 associated therewith and also keyboard output lines 25. Each of these sets of lines connect to the microcomputer 28. The keypad 22 is shown separated into a function keypad area 27 and a data keypad area 31. Furthermore, the functional keypad area is separated into left hand and right hand areas. In the function area 27 in the programming section thereof there is shown a start button 46 and a finish button 48. In the response area of the functional section of the keypad there is a start button 50, a finish button 52, and an intermediate button 54.

The activation of keys, switches or buttons on the keypad is sensed by a scanning multiplexing system conventionally used in scanning the keys of the keyboard associated with the microprocessor. Upon activation of one of the switches, a signal path is coupled by way of the keyboard to the microprocessor in a time slot corresponding to that key. Thus, one can determine which unique functional key is selected and which data line is activated. However, the system is not meant to identify the exact data key that is pressed since there are multiple entries associated with each line. These multiple entries are preferably associated with both the programming aspect of the invention and the response aspect.

FIG. 6 shows both a programming overlay 56 and a response overlay 58. These overlays are individually adapted to be positioned on the keyboard shown in FIG. 1 over the opague film or layer 24. Although FIG. 6 shows the overlays as being two separate overlays, they may be incorporated into a single overlay. In this case the response area of the overlay is limited to the left and the programming area on the right.

As indicated in FIG. 5 the keyboard may have in the function keypad area 27, three keys, buttons or switches relating to response and two relating to programming. These functional keys are for informing the device of the beginning and end of an operational activity. When the programming start button 46 is pressed, and this action is decoded, this is interpreted by the microcomputer as initializing a new activity. The memory of the microcomputer is cleared in readiness for accepting new appropriate programming data.

The programming finish key or button 48 when pressed and decoded, informs the system that the programming data and appropriate entries have been entered and concluded. The system then undertakes the following steps. It immediately exercises a checking function to examine whether the player entered the data correctly. This checking mode can be made increasingly error free by providing complex error detecting codes. However, for the sake of simplicity, there is described specifically herein a one keystroke checking concept described in further detail hereinafter. Should a programming error be detected by this parity checking operation, a start over or error sound is emitted from the speaker and the display is reinitialized, requiring a repeat of the data entry programming mode beginning with the programming start button 46. The entry is then repeated. A programming error can be created by a double keystroke, a wrong entry sequence, or skipping a data entry. Should the error checking conclude that the program has been entered correctly, then the entered data is further analyzed. The algorithm selection data is extracted, and the internal processing is transferred to the selected algorithm program. In this regard note FIG. 7 and the microcomputer 28 which is shown sectioned into a read only memory (ROM) 64 and a random access memory (RAM) 66. It is the ROM 64 that contains algorithm instructions and which also contains the parity checking routine. The RAM 66 is for the temporary storage of the input data from the keypad.

After the programming has been successfully completed and the appropriate algorithm has been selected by the preferred two algorithm key selections, the player is now ready to input responses. The player indicates this readiness by selecting the response start key 50, indicating to the device that any keys thereafter are specific data responses which compose the player's specific answer to the stimuli presented.

The start key 50 may also be used for starting over if one is not pleased with an initial answer. This key can thus be employed anytime before exercising the last function key, "finish", without there being any penalty in the tabulation of the number of unsuccessful tries which is another feature of the system to be described hereinafter.

After the data responses have been entered then the response finish key 52 is activated by the player or programmer. The system now analyzes the responses which have been sequentially stored in the memory 66, compares them against the previously inputted program, also retained in memory 66 and displays scores on visual lighted displays and generates accompanying appropriate sounds or tunes.

Some program/activity sheets call for twenty or more answers with each answer consisting of multiple keystroke entries. For example, there may be a plurality of addition problems with each answer to the problem requiring three keystrokes. In this case the intermediate finish key 54 may be employed. When pressed, this would display correctness of answer to the intermediate question with accompanying appropriate sounds. However, the questions continue to be posed with that same display sheet overlay, each requiring an intermediate finish, and only when all the questions have been presented and answered is the response finish key 52 selected. This would then provide a total score regarding all the intermediate answers.

Figure 8:
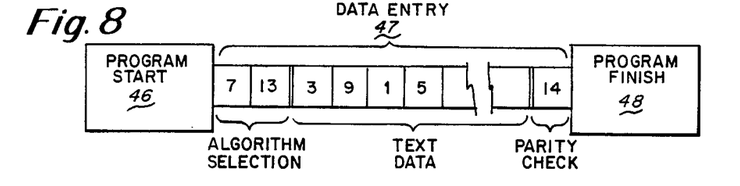
FIG. 8 is a diagram showing the sequence of keystrokes during the programming mode.

FIG. 8 is a diagram helpful in illustrating the sequence during the programming mode. The program start function is shown at the left end of the diagram and the program finish function at the right end of the diagram. Intermediate these two functions is the data entry section 47. The data keys are numbered in FIG. 8 to correspond with data lines which in this instance may total lines #1–#16. The particular numbers selected in FIG. 8 are variables depending upon the format of the overlay activity sheet. These are broken up into three basic parts including a two digit algorithm code, specific data text, and a one digit parity code. The activation of these keys in the left-to-right order shown in FIG. 8 is sequentially stored in the RAM memory 66 of the microprocessor. At the time of entry it is simply stored and is not analyzed until the second function key or the program finish key 48 is activated.

Figure 7:
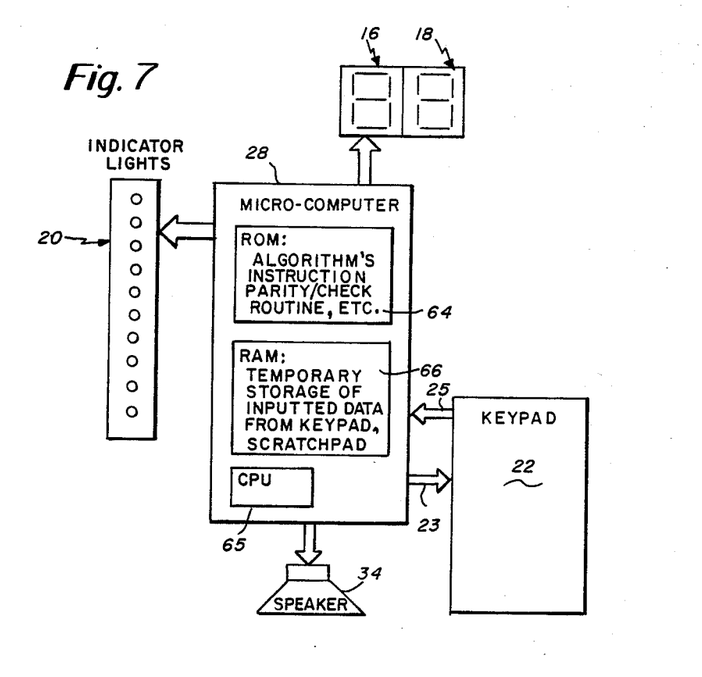
FIG. 7 is a functional circuit diagram of the electronics of the present invention.

As indicated previously, the ROM 64 shown in FIG. 7 contains a number of algorithm instruction sets. Seventeen distinct algorithms have at this time been conceived and implemented but many others are possible. Two activity examples are now given. The expansion to further algorithms is possible simply by incrementing the size of the ROM in the microcomputer where the instruction set of these algorithms reside.

The main control of the electronics is with the conventional microcomputer 28. This may be, for example, a Rockwell PPS/4 series or 6500/1 series. Another microcomputer chip is the Texas Instruments 1000 or 7000 series. As indicated in FIG. 7, the microcomputer chip contains a central processing unit 65 which executes instructions, a scatch pad memory, namely RAM 66, which temporarily stores results of calculations, keystroked data inputs, etc., and a stored permanent memory program bank in the ROM 64 which comprises fixed instructions. The instruction group that is to be executed, and the steps which the processor take are determined by the results of internal decisions and calculations, based on the player's or programmer's data input keyed during programming, and his data respones during play.

The algorithms stored in the ROM may be grouped into two simplified classes of instruction sets permanently stored in the memory program bank. First, there are multiple algorithm programs with specific organized instructions that analyze the programmer/player response to the different stimuli presented. For example, requiring the player to spell a word such as "FROG" from a group of letters is a different process than requiring the player to select five vowels in any order from a cluster of several letters amongst which are the five required vowels.

The second class of instruction sets are general purpose routines. These are an internal sequence of instructions such as to turn on certain lights, indicate how many errors, or send a "bells and whistles" congratulatory tune to the speaker.

With regard to the classes of instruction sets, hereinafter these should be referred to as algorithm I and algorithm II. These are two of many algorithms available and selectable easily and readily through the design approach.

Reference is now made to FIG. 6 and the two overlays 56 and 58 shown therein. It is understood that these overlays could be in a single overlay but with substantially the same subject matter as shown in the two overlays in FIG. 6.

With reference to FIG. 6, in the programming mode, the start button 46 is the first button to be pressed. It is understood that this button is not actually visable through the overlay but is in the position under the overlay illustrated by the button 46 shown in FIG. 6. Notations 70 and 71 are shown on the progam mode overlay. Finger pressure selection actuates thereunder hidden associated keys. Thereafter, four data keys are activated again by notations appearing on the overlay and hiding the keys thereunder. The algorithm notations 70 and 71 may actuate keys in data lines #7 and #13 as indicated in FIG. 8. FIG. 8 corresponds with the data keys shown in FIG. 6 and in this instance four data keys have been selected associated with lines #3, #9, #1 and #5. There is also a parity check notation 72 with a graphic indication on the overlay that the next function is the program finish function which is accomplished by pressing the finish switch 48. Again, this is pushed in a secretive manner as the overlay only shows a circle or the like designation such as the bullseye shown in FIG. 6 having a key thereunder. The parity check notation 72 as illustrated also in FIG. 8 is associated with data line #14.

The four specific keystrokes (data text) have thus been entered and this data is also now temporarily stored in memory. This data corresponds to the correct spelling of the word DESK. When the player is in the response mode, having depressed the response start key 50, only the exact sequential depression of lines #3, #9, #1 and #5, and then the response finish key 52 will give the correct answer. Therefore, there are several criteria applied which are permanently structured in the stored program bank in the ROM area of the microcomputer and entitled "Algorithm I". This stored program refers to the four text data line numbers unique to this question sheet, located in temporary memory, having been placed there during the program mode and in this specific example being the data lines #3, #9, #1 and #5. Hence, when the player is responding after the initial response start, he presses the symbol D on the overlay 58 which is in correspondence with one of the multiple keypad entries on line #3. The next selection is of the letter E located on one keypad on line #9. Next, is the letter S which is disposed over one of the keypads on line #1. Finally, the letter K is selected and this corresponds with an entry on line #5. Any further entry beyond these four is incorrect. Therefore, the system expects to see the response finish button 52 activated next so that it can jump into another section of the permanent memory instruction bank whch will execute a "correct display" and "congratulation" tunes. This same algorithm is employed for requiring the player to select (6 or any other number) entries in order (using another game overlay sheet of course). Also, this algorithm can require repeat keystroking of symbols which would not be apparent to the player during programming. This has been discussed previously.

Consider for example the word WINDOW. The data key entry during programming selects any arbitrary and therefore convenient line numbers for the first five letters. Now the last letter (the second W) also is programmed on the same line such as line #4 for the previous W. However, a different keypad entry during programming to line #4 (recall there are multiple keypad entries into each of many discrete lines), is selected for the second W. The programmer/player has now entered six text keys all spatially different and is unknowledgeable to the fact that the first and last entries are identical.

With regard to algorithm II having been inputted by programming two different initial keystrokes (algorithm selection), this may be used in an activity wherein say one is to select five vowels. The memory has also stored five text data keystrokes by way of instructions on the programming overlay. In the response phase it now awaits five keystrokes, after the program start but these may be in any order. Should less than or more than five keystrokes be entered, then the algorithm instruction set notifies the processor to jump to another series of instruction of general purpose routines located in ROM 64 which generates an "incorrect" display and an accompanying "bad" tune. Should five keystrokes be detected, and they are the proper ones regardless of order, then this algorithm instructs the processor to again generate both visual and auditory signals signifying the correct response.

As previously mentioned, the correct symbols/responses are visually apparent in the response area of the activity sheet or overlay, each one judiciously positioned over a keypad assigned to a predetermined line. The example given in algorithm I was programmed for four sequential lines. Once this was programmed, any number of similar activity sheets may be employed without reprogramming. Thus any activity requiring four sequential separate responses don't require reprogramming where the correct symbols are again to be found in the response area sequentially over the same lines.

As mentioned previously, the overlays may be two separate overlays as shown in FIG. 6 or they can be incorporated into a single overlay. Furthermore, the overlay or activity sheet may have the programming instructions on one side and the response or play area on the other side thereof.

The switch pad arrays such as shown in FIG. 3 may also have increased complexity such as one having 15 different lines with anywhere from five to eight different keypad entries for each line. This provides an extensive varied visual array which is indecipherable as far as the player is concerned. The player cannot extract any information from prior play during the program mode even though a new program was not entered.

Furthermore, the teaching activity need not be limited to only spelling. For example, one question could be "Name the next four planets in order after earth, starting outward from the sun." All nine planet names may be found in the response area but only Mars will be found above line #3, Jupiter above line #9, Saturn above line #1, and Uranus above line #5, and these four entries are each the only symbols to be found on each of these lines.

The five remaining planets (incorrect and henceforth to be entitled "distractors") are located above any of the other remaining lines which include lines #2, #4, #6, #7, #8, and #10-#16. These five distractors could be located one on each line or all could be on one line if that line has sufficient (keypad entires) switches. Hence, selecting an incorrect answer will activate a unique line which the system recognizes as totally incorrect, and will, through its instruction program found in algorithm I instruction set, execute the "wrong display and tune".

Therefore, many algorithms can be implemented into the system simply requiring the provision of a larger capacity in the microcomputer's permanent memory bank (ROM). Each algorithm accommodates a multitude of stimuli/activities/concepts. One programming entry or sequence can be used in association with a multitude of stimuli/activiy sheets (overlays). The programming provides preferably no clue to the solution of the activity. Repeating letters during programming is not apparent, since different keypads may be selected, allowing multiple but diverse entry into the identical, previously selected (progammed) line. One initial algorithm can call upon several other algorithms as subsets for more complex operation. Response symbols and notations employed on new game overlays employing identical lines, can be redistributed throughout the response area so that again there is no visual clue to the player. Distractors can be distributed throughout the response area on unused lines. One line might have, for example, eleven keypad entries, and when not a selected line, can therefore accommodate eleven distractors. Hence, one does not need one unique line for each unique symbol. For example, one does not need twenty-six separate uniquely identifiable lines to identify twenty-six different letters in the alphabet. The present system only requires as many unique lines as the response dictates, and then the accommodation of the number of distractors that is to be incorporated can be made by the many multiple entries on each of say few nonselected lines.

Hereinbefore has been discussed the general concept of algorithms, which are functionally a series of instruction sets permanently stored internally in the system; more specifically in the ROM 64 of the microcomputer 28. These algorithms are inputted by the programmer and are selected by decoding of the first two entries after the programming "start". Basically, an algorithm reviews the player's actions and sequences. It judges the correctness of these actions by comparing the responses with the saved text data inputted by the programmer/player during the program mode, and finally activates the appropriate displays and tones through selection of other general purpose groups of ROM instructions.

In the preceding description and with regard to the example of FIG. 6, the combination of the first two keystroke entries at notations 70 and 71 after the program start action defines the selected algorithm. Since a system might typically have sixteen different lines, then one can uniquely address and bring into action any of 16×16 (or 256) algorithms.

Hence, the microcomputer, after receiving the program start signal, looks for the next two keystroke data entries and decodes them to select a single particular algorithm. The next group of keypad strokes indicated in FIG. 8 are text data which is the specific response that is to be solicited from the player and against which the player is judged as to the correctness of play.

The next key that is depressed after the text data has been selected is the parity/check key shown by the notation 72 on the overlay 56. Although this is shown as a single notation, the parity checking can be accomplished by two or more entries depending upon the degree of security one wishes to implement in this programming phase. With regard to FIG. 8, the parity check is line #14. After the parity selection then the text on the programming overlay directs the player to press the finish button 48. During the interval between the program start and program finish the data entered is stored in sequentially updated memory cells available in the microcomputer chip identified in FIG. 7 as the RAM 66.

When the program finish button 48 is pressed the system in accordance with predetermined ROM instructions performs a mathematical analysis upon the data entered and determines the correctness of this data entry. Since the data entry contains the applicable algorithm and also provides the text data against which the player is to be measured, a technique is incorporated to provide a degree of certainty that this sequence of keystrokes during programming was entered properly. Many "weighing schemes" can be constructed which can provide a confidence level that the programmer entered the data correctly; correct keys, correct order. One keystroke assigned for parity with 16 different active lines will provide a 93% confidence level. Ten active lines and one keystroke for parity providea 90% confidence factor. Two keystroke assignments with more complex checking instructions raise this assurance structure above the 99% level. Although the parity checking is important in accordance with the present system.

Hence, after the program finish activity the following sequential operations occur:

1. The parity notation is analyzed. If not confirmed, the player is instructed through the display and tone speaker to repeat the programming mode, again beginning with the program start key.

2. With the parity once confirmed, the system computes the proper algorithm from the first two entry keys, and releases control to this appropriate selected algorithm and its instruction set.

3. The algorithm sets up its modes of display, copies the programmed text data into working registers (scratch pad memory-RAM) and informs the player that the device is now ready to accept responses.

4. The player begins by first keying in the response start then his specific answer or answers.

5. The answer or response data is sequentially stored in memory as entered.

6. The player concludes with the functional response finish key.

7. The algorithm instruction set now resumes control and according to the specific algorithm compares the initial stored text data found in one memory compartment entered during the program mode with the stored response data in another memory compartment entered during the response mode.

8. Based on the correctness and the mode of present action, appropriate displays and tones are generated.

9. The player may repeat his response mode simply by starting again keying the functional response start key.

Two dominant display modes are selectable from the applicable algorithm. Previous examples have described what may be referred to as a senior version of display with no presentation of correctness until all of the responses are entered and the player concludes with the response finish key. This type of presentation is challenging and discourages random hit or miss attempts by the player.

However, there are other games wherein one might wish to provide immediate feedback at each incremental step. Again, the selection of these different display modes is imbedded in the instruction set of the algorithm.

For example, consider a game for children spelling a four letter word such as FROG. Should it be misspelled in accordance with the senior version display, he might be informed that he correctly spelled three out of four letters. He would not know which was incorrect. In some cases, therefore, one may wish to provide immediate indication with each keystroke and provide an audible and/or visual signal upon entry of an incorrect keystroke. In this way the player gets incremental acknowledgement of each step as he progresses through the required steps.

Because of the simplicity of programming with the system of this invention, one can provide simple programming notations which may correspond to elaborate symbols or legends in the response area. In this way many extensive games and skills can be implemented. Games similar to Mastermind and Sensor can be implemented. Thus, teaching activity need not be limited to numbers or letters normally employed in such games/devices, like Mastermind, Sensor, etc., but can be powerfully or readily extended to words, symbols and other descriptive contents.

The game commonly known as Hangman playable with the present device, contains a hidden word and indicates to the player the existence or location or nonexistence of the player's guessed letter. This concept and therefore its applicable algorithm can be extended into a teaching mode; instead of eight blank spaces which would be employed for guessing say the word DUPLICATE, eight different answers may be defined in these spaces. Pressing a selection in the play area activates this answer area (any of eight positions). Hence, this gives the player/student the immediate right answer to the eight stimulus questions.

There has been described hereinbefore a keyboard that is comprised of a plurality of switches which may be membrane type switches. However, other types of switches may also be employed such as touch sensor switches using such principles such as capacitive sensing.

Some games or skill activities may require the sequential keying of say eight response keys. For example, spelling an eight letter word, with all letters different, or selecting the first eight presidents of the United States from a field of more than eight names, therefore including distractors. This requires during the programming mode, entry keying of not only function keys, algorithm selection and parity keys, but also the eight text data keys. In accordance with another embodiment of the invention this programming can be simplified by employing a single keystroke (a single data line) to essentially replace the aforementioned eight data lines. This single data line then addresses a table which provides the eight data keys. Because of the preferred multiplicity of entries to any line, both during "program mode" and "response mode", a player can select this same key line, which accesses the same table at the identical location. Hence, the same data text is created and the player is completely unaware that the identical pattern is being used. It is not apparent during programming nor is it apparent during play.

An embodiment described up to now, such as in FIG. 6, in its fundamental form, outlines a sequential series of data lines during programming and requires that the player select those and only those lines for correct play. For example, in the example of FIG. 6, the player programs data text lines #3, #9, #1 and #5; and he must respond employing the same line numbers. However, in accordance with another embodiment of the invention, a coding technique can be incorporated so that there exists a one-to-one correspondence between lines selected during programming and lines selected during response or play. In this way the same line numbers need not be correct responses corresponding to line numbers entered during programming.

By way of example assume ten available lines, lines #1–#10. The following shows a possible inter-relationship between programmed lines and response lines:

| Programmed lines | 1 | 2 | 3 | 4 | 5 | 6 | 7 | 8 | 9 | 10 |
|---|---|---|---|---|---|---|---|---|---|---|
| Response lines | 10 | 9 | 8 | 7 | 6 | 5 | 4 | 3 | 2 | 1 |

Hence, the programmed lines #3, #9, #1, and #5 requires the players responses on lines #8, #2, #10, and #6. Also any other sets of corresponding numbers can be selected.

One of the features of the present invention, is the simple, multiple entry to a limited number of data lines by the use of dispersively disposed keypads making the keyboard structure essentially invisible to the player. The programmer or player simply finger-indexes legends or notations (dots, symbols, etc.) found on the programming overlay sheet and also found on the response overlay.

In one version of the present invention the keyboard can be manufactured from transparent conductors. Instead of printed overlays, the two steps of programming and response may be in the form of film slides or film strips. Commercially available film strip viewers may be used to project a picture upon a glass screen which can now embody the transparent keyboard. The player first projects the programming image, finger-strokes the program and when this data is accepted, after the program finish function, the film strip can be automatically or individually advanced to the next projection for play or response. This process rear-projects the overlay and again the precise judicious juxtaposition of legends with selected transparent keypads provides both program entry and interactive play.

In one embodiment previously described, there have been sixteen active lines, with multiple entries to each line. Actually, there do not exist sixteen separate physical lines; just like there does not exist nine separate physical lines in the 3×3 keypad. The selection (pressing) of any keypad (for example on a 3×3 array) generates a unique relationship between one of three vertical circuits, A, B or C on the upper plate, and one of three horizontal circuits #1, #2 or #3 on the lower plate. Please refer in this regard to FIG. 2. Thus, on a 3×3 keypad there are nine unique combinations, similarly, on a 4×4 keypad there are sixteen. These are decoded by the microcomputer and treated as though they were nine and sixteen, respectively, for different distinct variables or lines.

Figure 9:
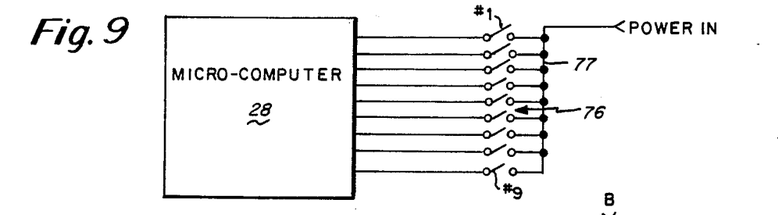
FIG. 9 shows another embodiment of the present invention in which there are provided an equal number of switches and direct data lines.

In another embodiment of the present invention illustrated in FIG. 9, there can be nine separate switches and associated therewith nine separate paths coupled to the microcomputer 28. FIG. 9 illustrates the series of nine switches 76. Having one side coupled to the power line 77.

The array technique, illustrated previously in FIG. 2 embodies nine separate switches or keypads but only six paths interfacing with the computer including three strobe lines out and three sense lines in. See also FIG. 4 and FIG. 5 with the lines 23 and 25.

Figure 10:
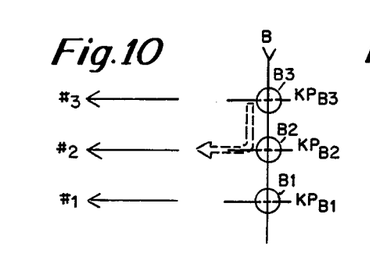
FIG. 10 shows a section of a 3×3 array showing an actuated signal path.
Figure 11:
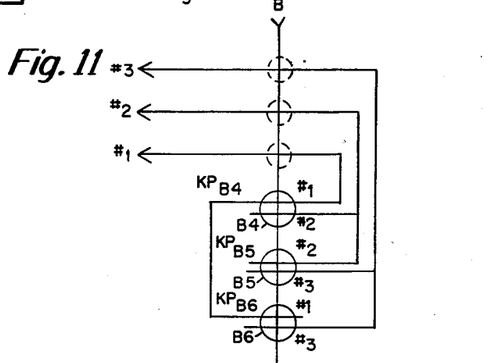
FIG. 11 is an alternate embodiment to the invention in which there are two lines associates with each switch.

Because only one strobe path is powered at a time, sequentially, then any detection of signal on the incoming sense paths can allow the microcomputer to calculate which specific keypad is activated. Consider one strobe path, such as path B illustrated in FIG. 10. Assume this to be momentarily activated. If the keypad B2 is depressed, activity by way of path B appears on path #2. Now, without any further addition of either strobe or sense paths, one can create three additional keypads. This is illustrated in FIG. 11. Thus, in FIG. 11 there are shown keypads B4, B5 and B6. Depressing keypad B4 activates sense paths #1 and #2. Depressing keypad B5 activates sense paths #2 and #3. Depressing keypad B6 activates sense paths #1 and #3. There may also be provided a seventh keypad B7 which is used to activate all these sense paths simultaneously.

Therefore, by a simple analysis of three sense paths with one strobe path, seven different keypads can be identified when depressed. Similarly, with four sense paths and one strobe path, fifteen different keypads can be used and detected. A formula for the number of distinct keypads is as follows: KP=2−1 where #KP equals the number of keypads and N equals the number of sense lines.

Each additional strobe path provides another unique set. Therefore, with three sense paths and three strobe paths, one could ultimately provide twenty-one unique keypads.

The use of multiple sense paths under a keypad generates some degree of topological complexity, and also imposes mechanical/electrical constraints. All of the multiple sense paths are required to be activated virtually simultaneously and continuously by the selected probe line during the depression of the keypad. For practical purposes, it is preferred that there should be no more than two lines per keypad.

The present invention has the ability to program and respond with the same keyboard through sequential overlay. This keyboard then has a grouping of strobe paths which are rapidly and sequentially activated. The grouping of sense paths are stimulated during a keypad depression. By logical analysis, one can immediately identify the unique keypad selected and depressed by the knowledge of which strobe path and which combination of sense paths have been activated. Each keypad can then be identified and can then be conceived as a "line". If two or more keypads individually disposed on the keyboard create the same result, then we can view this as two or more (multiple) inputs to this same "line".

Because the microcomputer can react to each keypad, interpreted and process it as a line, then there are some other unique techniques which may be developed employing the intrinsic capabilities of a microcomputer. One can simply and effectively transform an array of M×N unique, simple keypads into the keyboard with all the attributes described previously.

Consider, for example, an 8×8 keyboard with eight strobe paths and eight sense paths and with sixty-four unique keypads. The microcomputer now initially recognizes any of sixty-four keypads. It can "look up" a stored table in its instruction set (ROM) and redefine that particular keypad as being a member of a certain line such as, for example, line #13. In the aforementioned 8×8 array, there are strobe lines A–H and sense lines #1–#8. Assuming that keypad D5 is pressed, the stored table shows this to data line #13. For example, key D1 may correspond to line #14, key D2 to line #5, key D3 to #2 and key D4 to line #10. There may also be other entries identified as line #13 such as entries H3 and C1, for example. Thus, the key depression D5 is simply processed by the microcomputer as a line and in this example as line #13.

Figure 12:
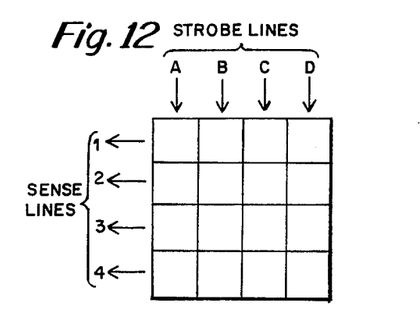
FIG. 12 shows a 4×4 array with associated data lines including strobe lines and sense lines.
Figure 13:
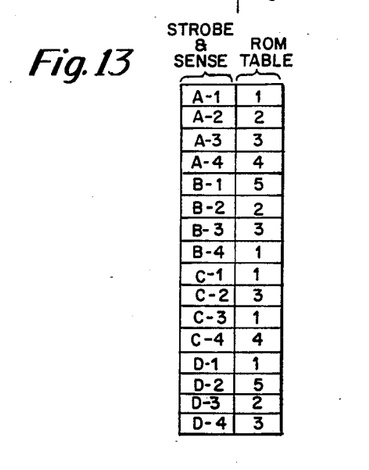
FIG. 13 is a look-up table associated with an array such as shown in FIG. 12.

FIGS. 12 and 13 illustrate this "table look-up" concept. The table can be structured for as many lines as the designer wishes to incorporate, and can allocate as many multiple entries on each of the lines s desired. Consider, for example, a 4×4 keyboard as illustrated in FIG. 12 strobe lines A, B, C and D and sense lines #1, #2, #3 and #4. There are thus sixteen unique keys (A1-D4). Let us assume only five data lines, #1–#5. FIG. 13 illustrates the strobe and sense notations and also the corresponding ROM table designating the five different lines with there being multiple entries to these lines. For example, keys A1, B4, C1, C3, and D1 will all give entries on data line #5.

This transformation of a structured arrangement of M×N =T unique keypads into limited "lines" (5 in the above case) with multiple entries, thus creating the spacially distributed redundancy, can also be accomplished by other available computer programming techniques besides a table look-up. The simultaneous strobe and sense information can be interprocessed, achieving the desired result of a keyboard which has a number of lines with multiple entries.

Figure 14:
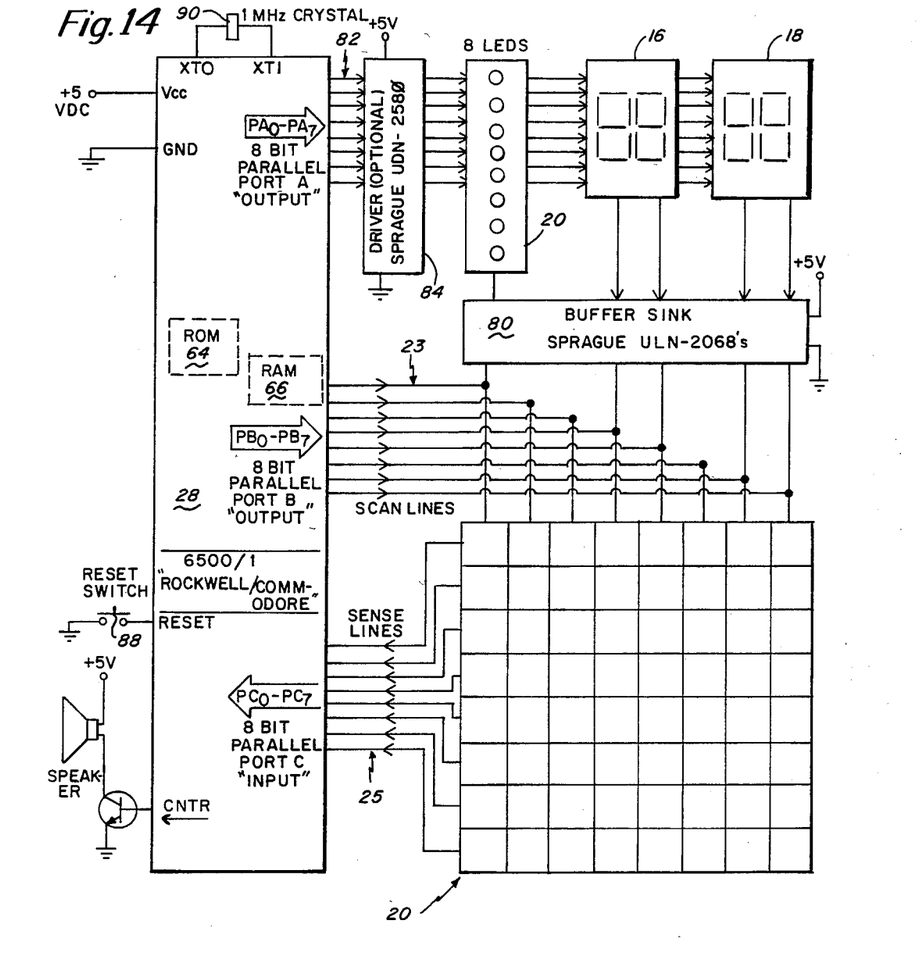
FIG. 14 is a functional diagram similar to that of FIG. 7 but showing additional specific detail.

FIG. 14 is a functional diagram showing in somewhat more detail the system of the present invention. This is shown in more detail than the previous more general diagram of FIG. 7. In FIG. 14 the microcomputer 28 is a Rockwell/Commodore 6500/1. FIG. 14 shows the sense lines 25 and the scan lines 23 referred to hereinbefore. Also shown is the membrane switch array 22 which in this example is an 8 by 8 array. The scan lines 23 also connect by way of the buffer sink 80. The output from the buffer sink connects to the indicator array 20 and also to the aforementioned indicator 16 and 18. The indicator data lines 82 couple to drivers 84 which in turn couple to all of the indicators shown. FIG. 14 also shows the speaker 34 being driven from the microcomputer by way of transistor 86. There is also provided a reset switch 88 and a crystal 90 used as the main oscillator for the microcomputer.

What is claimed is:
1. A teaching device comprising:
a console comprising a keypad including switches arranged in a number of sets with each set including a plurality of switches and a data line;
processor means interconnected with the keypad for receiving manually entered signals from the data lines and preprogrammed with at least one algorithm,
overlay means adapted to cover said keypad so that said keypad switches are hidden and having indicia means descriptive of the game or teaching activity represented by the overlay means,
said overlay means comprising overlay programming means having visual indicia representative of predetermined instructional solutions for the temporary secretive programming of the processor means,
said overlay programming means indicia overlying switches of the keypad which are activated in an ordered sequence representative of a particular solution,
said overlay means further comprising overlay play means having visual selection notations each overlying switches of the keypad,
said processor means adapted to store said predetermined solution for comparison with the keys selected during operation in conjunction with said overlay play means, at least some of the total number of switches, of the ordered sequence representative of a particular solution, being in different keypad locations than switches underlying the visual selection notations of the overlay play means.

2. A teaching device as set forth in claim 1 wherein said keypad comprises an array of switches with the switches in a set being arranged in a random pattern over the keypad.

3. A teaching device as set forth in claim 1 wherein said keypad comprises an elastomeric keypad including a pair of switch contact layers.

4. A teaching device as set forth in claim 1 wherein the preprogrammed algorithm defines the nature or type of game or question.

5. A teaching device as set forth in claim 1 wherein the program overlay means is associated with a program section of the keypad, and the play overlay means is associated with a play section of the keypad.

6. A teaching device as set forth in claim 5 wherein the program section includes a program mode select switch, at least one algorithm select switch and an execute instruction switch.

7. A teaching device as set forth in claim 6 including a verify code switch.

8. A teaching device as set forth in claim 5 wherein the visual indicia of the overlay programming means gives separate visual instructions to the user to begin by activating an indicated sequence of keys in a indicated order including mode selection, algorithm selection, data solution selection and execute selection.

9. A teaching device as set forth in claim 1 wherein the overlay means comprises separate overlay sheets, one for programming and one for play.

10. A teaching device as set forth in claim 1 wherein the overlay means has programming and play in a single sheet.

11. A teaching device as set forth in claim 1 wherein the play overlay means has notations corresponding to the correct solution and other notations corresponding to incorrect solutions.

12. A teaching device as set forth in claim 1 including a program start switch and a program finish switch.

13. A teaching device as set forth in claim 1 including a response start switch and a response finish switch.

14. A teaching device as set forth in claim 1 including a plurality of data lines with there being a correspondence in line numbering between programming and response.

15. A device as set forth in claim 1 including a plurality of data lines wherein there is a lack of correspondence between line numberings, between programming and response.

16. A device as set forth in claim 1 wherein the switches are arranged in an array having input strobe lines coupled from the processor means to one side of the array and output sensing lines coupled to the processor means from another side of the array.

17. A device as set forth in claim 16 wherein the data signals are formed by presence of continuity from a strobe line via a selected switch to a sense line.

18. A device as set forth in claim 17 including a plurality of lines associated with a single switch actuation.

19. A device as set forth in claim 16 wherein said processor means has table look-up means selecting a predetermined data signal in accordance with a particular switch selection.

20. A device as set forth in claim 1 wherein a data set is selectable by actuation of less than all data entries.

21. A device as set forth in claim 20 wherein one switch actuation can select an entire data entry at programming.

22. A teaching device comprising; a console comprising a keypad including switches arranged in a number of sets with each set including a plurality of switches and a data line, processor means interconnected with the keypad for receiving manually entered signals from the data lines and preprogrammed with at least one algorithm, overlay means adapted to cover said keypad so that said keypad switches are hidden and having indicia means descriptive of the game or teaching activity represented by the overlay means, said overlay means comprising overlay programming means having visual indicia representative of predetermined instructional solutions for the temporary secretive programming of the processor means, said overlay programming means indicia overlying switches of the keypad which are activated in an ordered sequence representative of a particular solution, said overlay means further comprising overlay play means having visual selection notations each overlying switches of the keypad, said processor means adapted to store said predetermined solution for comparison with the keys selected during operation in conjunction with said overlay play means, wherein less than all data lines are selected for the inputting of the predetermined instructional solution with the non-selected lines being associated with incorrect notations of the play region, wherein the play overlay means has notations corresponding to the correct solution and other notations disposed in other keypad locations and corresponding to incorrect solutions.

23. A teaching device comprising;

a console comprising a keypad including switches arranged in a number of sets with each set including at least one switch and a data line, means interconnected with the keypad for receiving manually entered signals from the data lines and preprogrammed with at least one algorithm, overlay means adapted to cover said keypad so that said keypad switches are hidden, said overlay means comprising overlay programming means having visual indicia representative of predetermined instructional solutions for the temporary secretive programming of the means for receiving manually entered signals, said overlay programming means indicia overlying switches of the keypad which are activated in an ordered sequence representative of a particular solution, said overlay means further comprising overlay play means having visual selection notations each overlying switches of the keypad, and means adapted to store predetermined solution for comparison with the keys selected during operation of the keys in association with said overlay play means, at least some of the total number of switches, of the ordered sequence representative of a particular solution, being in different keypad locations, than switches underlying the visual selection notations of the overlay play means.

24. A teaching device as set forth in claim 23 wherein less than all data lines are selected for the inputting of the predetermined instructional solution with the non-selected lines being associated with incorrect notations of the play region and wherein the play overlay means has notations corresponding to the correct solution and other notations in different keypad locations and corresponding to incorrect solutions.

25. A method of teaching comprising the steps of;
providing a keypad including switches arranged in a number of sets with each set including at least one switch and a data line,
providing a means interconnected with the keypad for receiving manually entered signals from the data lines,
providing an overlay means that is adapted to cover the keypad,
said overlay means comprising overlay programming means and overlay play means,
disposing said overlay programming means over the keypad whereby visual indicia representative of predetermined instructional solutions on the overlay programming means provide for the programming of the means interconnecting with the keypad for receiving manually entered signals,
said overlay programming means indicia overlying switches of the keypad which are activated in an ordered sequence representative of a particular solution,
thereafter disposing the overlay play means over the keypad with the overlay play means having visual selection notations, each overlying switches of the keypad,
and storing predetermined solutions entered initially in association with the overlay programming means for comparison with the keys selected during operation of the keys in association with said overlay play means.

* * * * *